United States Patent
Morris-Takamoto et al.

(10) Patent No.: US 12,234,627 B2
(45) Date of Patent: Feb. 25, 2025

(54) OBJECT VISUALIZATION IN CONSTRUCTION HEAVY EQUIPMENT

(71) Applicant: Caterpillar SARL, Geneva (CH)

(72) Inventors: Kye Morris-Takamoto, Akashi (JP); Sirui Li, Akashi (JP)

(73) Assignee: Caterpillar SARL, Geneva (CH)

( * ) Notice: Subject to any disclaimer, the term of this patent is extended or adjusted under 35 U.S.C. 154(b) by 141 days.

(21) Appl. No.: 18/086,713

(22) Filed: Dec. 22, 2022

(65) Prior Publication Data

US 2024/0209595 A1 Jun. 27, 2024

(51) Int. Cl.
| | |
|---|---|
| *H04N 13/239* | (2018.01) |
| *E02F 9/24* | (2006.01) |
| *E02F 9/26* | (2006.01) |
| *G09G 3/20* | (2006.01) |
| *H04N 13/111* | (2018.01) |
| *H04N 13/296* | (2018.01) |
| *H04N 23/695* | (2023.01) |
| *E02F 3/32* | (2006.01) |

(52) U.S. Cl.
CPC ............. *E02F 9/261* (2013.01); *E02F 9/24* (2013.01); *E02F 9/264* (2013.01); *G09G 3/2092* (2013.01); *H04N 13/111* (2018.05); *H04N 13/239* (2018.05); *H04N 13/296* (2018.05); *H04N 23/695* (2023.01); *E02F 3/32* (2013.01); *G09G 2340/12* (2013.01)

(58) Field of Classification Search
CPC ... E02F 9/261; E02F 9/24; E02F 9/264; E02F 3/32; E02F 9/245; G09G 3/2092; G09G 2340/12; H04N 13/111; H04N 13/239; H04N 13/296; H04N 23/695
USPC .......................................................... 348/47
See application file for complete search history.

(56) References Cited

U.S. PATENT DOCUMENTS

| | | | |
|---|---|---|---|
| 9,115,482 B2 * | 8/2015 | Hargrave, Jr. .......... E02F 9/265 |
| 9,300,954 B2 | 3/2016 | Tanizumi et al. | |
| 10,829,910 B2 | 11/2020 | Yoshinada et al. | |
| 11,072,911 B2 * | 7/2021 | Li ........................... E02F 9/261 |
| 11,168,466 B2 | 11/2021 | Izumikawa | |
| 11,200,523 B2 * | 12/2021 | Petrany .............. G06Q 10/0633 |
| 11,236,492 B1 * | 2/2022 | Ready-Campbell .... E02F 9/267 |
| 11,459,215 B2 * | 10/2022 | Wong ........................ B60Q 9/00 |
| 11,828,046 B2 * | 11/2023 | Myers ..................... B66F 9/065 |
| 11,860,641 B2 * | 1/2024 | Bridenbaugh ........ B60R 21/013 |
| 11,898,331 B2 * | 2/2024 | Maley ................... E02F 9/2033 |
| 2014/0330513 A1 * | 11/2014 | Fratti .................... G01C 21/367 |
| | | | 701/455 |

(Continued)

FOREIGN PATENT DOCUMENTS

| | | |
|---|---|---|
| JP | 3623014 B2 | 2/2005 |
| JP | 2014-229364 A | 12/2014 |

(Continued)

*Primary Examiner* — Susan E. Hodges (57) ABSTRACT

A stereo camera constructed to generate video data and distance data is attached to a construction work machine. A location of a work tool attached to the construction machine is computed from sensor signals and the distance data are analyzed for an indication of an object located at the work tool. A video overlay is rendered including an object indicator that visually emphasizes an object image of the object at the spatial location of the work tool. A composite image of the rendered video data and the video overlay is displayed on a monitor.

20 Claims, 6 Drawing Sheets

(56) References Cited

U.S. PATENT DOCUMENTS

| | | | |
|---|---|---|---|
| 2015/0249821 A1 | 9/2015 | Tanizumi et al. | |
| 2019/0150357 A1* | 5/2019 | Wu | H04N 7/188 |
| 2019/0360177 A1 | 11/2019 | Kiyota et al. | |
| 2020/0108774 A1* | 4/2020 | Hashimoto | H04N 13/10 |
| 2022/0136215 A1 | 5/2022 | Shiratani et al. | |
| 2022/0332248 A1 | 10/2022 | Vazquez et al. | |

FOREIGN PATENT DOCUMENTS

| | | |
|---|---|---|
| JP | 6777375 B2 | 10/2020 |
| KR | 101755262 B1 | 7/2017 |
| WO | 2021/010258 A1 | 1/2021 |

* cited by examiner

OBJECT VISUALIZATION IN CONSTRUCTION HEAVY EQUIPMENT

TECHNICAL FIELD

The present disclosure relates to computer vision and object visualization, and more specifically to visualizing objects in a work area of a construction machine from inside an operator cab of the construction machine.

BACKGROUND

Operators of modern heavy material handling equipment, as might be found in the construction industry, can perform amazing feats with their machines. Key to performing such feats is a clear view of the work tool, i.e., the heavy equipment component performing a construction work task, and its surroundings. Often, however, the work tool is quite removed from the operator cab, either by an obstruction in the operator's line of sight or by an extensive reach of the machine. Track material handler model MH3250 manufactured by Caterpillar, Inc., offers a solution through a mechanism that elevates the entire operator cab for a higher point-of-view. Other solutions involve the deployment of digital imaging devices and techniques, e.g., digital cameras, computer vision, etc., at locations on heavy equipment that improve the operator's view of the work area. For example, U.S. Pat. No. 9,300,954 is directed to a surrounding information-obtaining device for a working vehicle and is one example of a system that seeks to improve an operator's view of the work area. An imaging device and a distance determining device are mounted atop a telescoping crane boom from which the boom operator receives distance (depth) information. U.S. Pat. No. 10,829,910 is directed to an image display system for a work machine and is another example of a system seeking a better view of the work. An imaging device and a distance detection device are mounted atop the work machine operator cab and a computed grid that indicates the terrain at the work area is displayed.

While these systems may offer a view of a remote work area, the line-of-sight to the work interface, i.e., where the work tool contacts the medium being worked, may be blocked by the work tool itself. Engineering research and product development efforts towards improved surrounding awareness for operators of heavy equipment are ongoing.

SUMMARY

In one aspect of the present inventive concept, a construction work machine has a working arm at a distal end of which a work tool is attached. A stereo camera is constructed to generate video data and distance data and an operator cab is constructed with an interior and an exterior. A monitor is installed in the interior of the operator cab and constructed to display visual data. A camera mount is mechanically coupled to the work machine and interposed between the exterior of the operator cab and the stereo camera and is constructed to position the stereo camera. Processor circuitry computes a spatial location of the work tool and analyzes the distance data corresponding to the spatial location of the work tool for an indication of an object thereat. The processor circuitry renders a video overlay including an object indicator that visually emphasizes an object image of the object at the spatial location of the work tool. A composite image of the rendered video data and the video overlay is displayed on the monitor.

In another aspect of the present inventive concept, an object visualization process in a construction work machine operating in a work area is provided. The construction work machine includes an operator cab from which an operator performs construction tasks in the work area and a traveling body by which the construction work machine moves along a ground surface. A work tool is attached to the work machine by which the construction tasks are performed in the work area. A spatial location of the work tool is computed and line-of-sight video data and distance data of the work tool at the computed spatial location thereof is captured. The distance data corresponding to the spatial location of the work tool are analyzed for an indication of an object thereat. A video overlay is rendered including an object indicator that visually emphasizes an object image of the object at the spatial location of the work tool. A composite image of the rendered video data and the video overlay is displayed.

In yet another aspect of the present inventive concept, an object visualization system on a construction work machine is provided in which the construction work machine has an operator cab from which working arm is operated to perform construction tasks and from which a traveling body is operated to transport the construction work machine across a ground surface. A stereo camera is constructed to generate video data and distance data from a position elevated above the operator cab. A monitor is installed in the interior of the operator cab and constructed to display visual data. Processor circuitry computes a spatial location of a target according to a configuration of the working arm and analyzes the distance data corresponding to the spatial location of the target for an indication of an object thereat. The processor circuitry further renders a video overlay including an object indicator that visually emphasizes an object image of the object at the spatial location of the target and displays a composite image of the rendered video data and the video overlay on the monitor.

DETAILED DESCRIPTION

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

Figure 1:
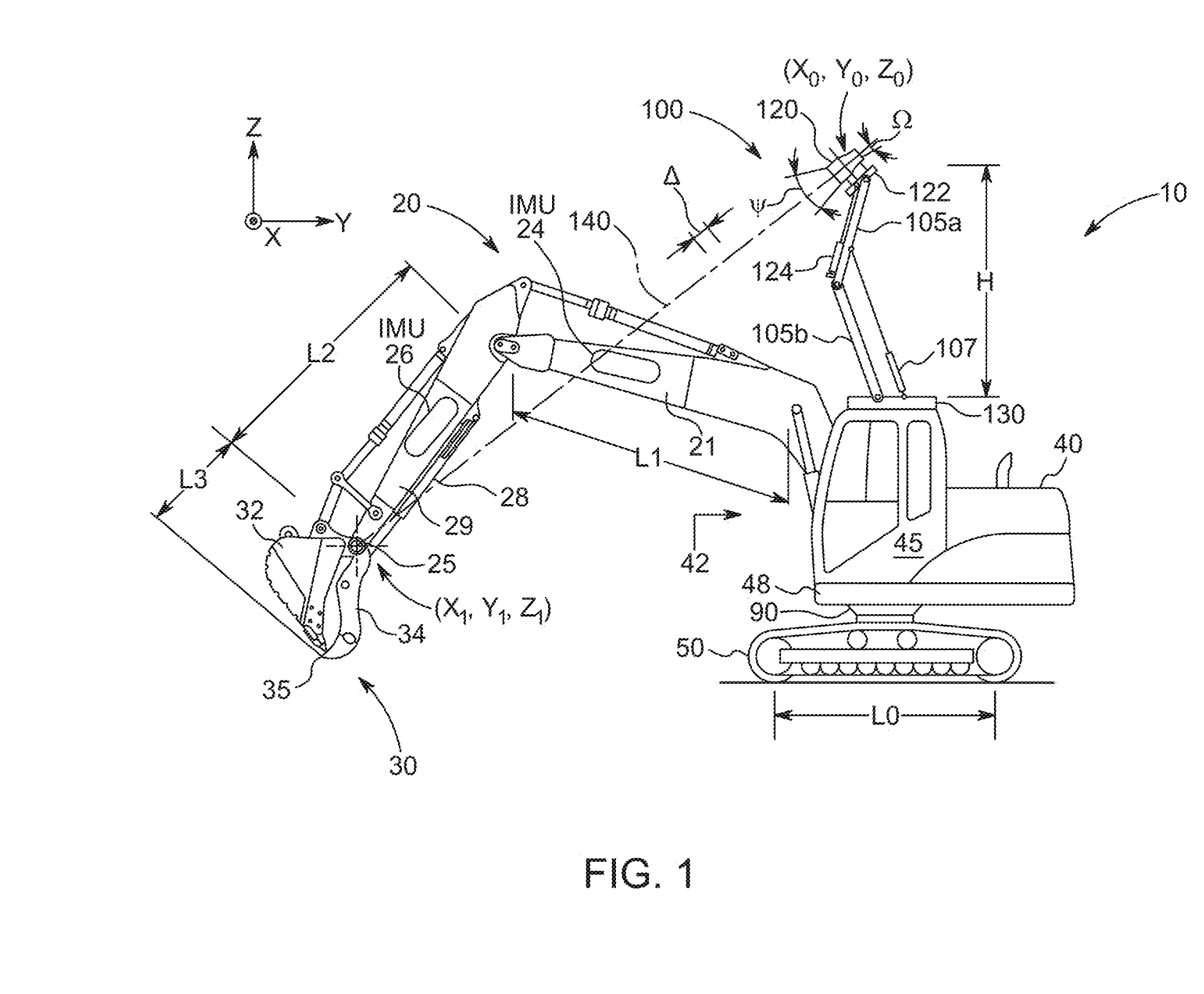
FIG. 1 is an illustration of an exemplary work machine by which the present inventive concept can be embodied.

FIG. 1 is an illustration of a hydraulic excavator serving as an exemplary work machine 10 by which the present invention can be embodied. It is to be understood that the disclosed subject matter is not limited to hydraulic excavators; skilled artisans will recognize other machines in which the present invention may be embodied. Work machine 10 may include an upper swing body, representatively illustrated at work machine body 40, that can be rotated about a turntable mechanism 90 mechanically interposed between work machine body 40 and a lower traveling body, such as exemplary work machine tracks 50. Work machine tracks 50 may be constructed or otherwise configured to support work machine 10 against gravity as well to provide a mechanism by which work machine 10 traverses the ground, e.g., the X-Z plane referenced by the coordinate axes depicted in the figure.

Work machine 10 may include a working arm 20 that may be constructed or otherwise configured to position a work tool 30 selectively coupled thereto. In the exemplary embodiment of FIG. 1, work tool 30 may combine a work tool bucket 32 with a work tool grappler thumb 34. Work tool grappler thumb 34 may be separately operable from work tool bucket 32 to afford a grasping feature and may serve as a cover for work tool bucket 32. However, as will be discussed in more detail below, different work tools 30 may be attached to working arm 20 and implementations of the present inventive concept may operate in a similar manner regardless of what work tool 30 is attached to working arm 20 for a given construction task.

Working arm 20 may be articulated and may comprise a boom 21 pivotally coupled to a stick 29 and operable into different spatial configurations via hydraulic actuators, representatively illustrated at hydraulic actuator 28. Work tool 30 may be selectively attached to stick 29 through one or more pins, representatively illustrated at tool connecting pin 25. Boom 21 and stick 29 may each have installed thereon a sensor, representatively illustrated at inertial measurement units (IMUs) 24 and 26, respectively, that generates a signal from which movement thereof is indicated, as is described below.

Work machine 10 may include an operator cab 45 from which a machine operator can, among other things, operate working arm 20 and work tool 30. The interior of operator cab 45 is described with reference to FIG. 2. For the present discussion, it is sufficient to note that operator cab 45 may installed on a chassis, representatively illustrated at work machine chassis 48, which itself is coupled to turntable mechanism 90. Further, embodiments of the present invention may implement a zero-riser operator cab, which, as used herein, is meant to refer to an operator cab 45 that is fixed in height, e.g., along the Y-axis. Principles of the invention obviate elevatable operator cabs, such as those described above, e.g., operator cab 45 may be fixed in height, e.g., parallel to the Y-axis, relative to work machine tracks 50.

As illustrated in FIG. 1, work machine 10 may have a reach or extendibility that can place work tool 30 out of view, representatively illustrated at operator field-of-view (FOV) 42. For example, the combined length L1 of boom 21 and length L2 of stick 29, L1+L2, may be substantially longer, e.g., twice the length than the base on which work machine 10 rests, e.g., L0. It is to be understood that such dimensionality is not required to practice the present invention, but the foregoing example condition, (L1+L2)>>L0, combined with an operator FOV 42 that limits the extent to which an unassisted operator can see the area around work tool 30 at that range is an example of an application for which embodiments of the invention are well suited.

Embodiments of the present invention may ameliorate the limited view issue described above, as well as provide an improved view overall of the area around work tool 30. For example, embodiments may deploy an elevated camera, representatively illustrated at stereo camera 100, that has a camera FOV $\psi$ sufficient to capture the working area at different ranges, or visual depths. Stereo camera 100 may be raised to a camera position $(X_0, Y_0, Z_0)$ to capture imagery at a target position $(X_1, Y_1, Z_1)$, which, in this example is fulfilled by the location of tool connecting pin 25. However, machines that embody the present invention may have access to a database, such as that described below, that contains information on a variety of work tools 30. As such, a target position $(X_1, Y_1, Z_1)$ may be selected that is closer to the work interface. For example, such a database may be consulted for dimensions of work tool 30 to obtain, among other things, work tool length L3. When so embodied, work machine 10 may compute the location of distal end 35 of work tool 30 as the target position $(X_1, Y_1, Z_1)$.

To elevate stereo camera 100 to a suitable height H, embodiments of the invention may employ an extendable camera mount, such as articulated camera mount (ACM) 120, which may be rigidly attached to work machine 10 by an ACM machine mount 130 exterior to operator cab 45. Stereo camera 100 may be rigidly attached to ACM 120 by an ACM camera mount 122. In the example illustrated in FIG. 1, ACM 120 resembles a pantograph, i.e., the structure atop electric trains and the like that raises conductive plates against overhead electrical wires. It is to be understood, however, that such structure is not essential to the practice of the present invention. Nevertheless, in the example shown, ACM 120 comprises an upper ACM link 105a and a lower ACM link 105b pivotally connected one to the other. Stereo camera 100 may be raised and lowered on ACM 120 by activation of an ACM extension actuator 107 and may be tilted to a camera tilt angle $\Omega$ by activation of an ACM camera tilt actuator 124. At ACM elevation H and camera tilt angle $\Omega$, stereo camera 100 may acquire a camera line-of-sight 140 aimed at a target on working arm 20 or work tool 30 and to determine a range to target $\|(X_1, Y_1, Z_1)-(X_0, Y_0, Z_0)\|$. Skilled artisans will appreciate that, as a binocular system, data from stereo camera 100 may be used to compute distance, or visual depth, at least to a distance resolution $\Delta$.

Figure 2:
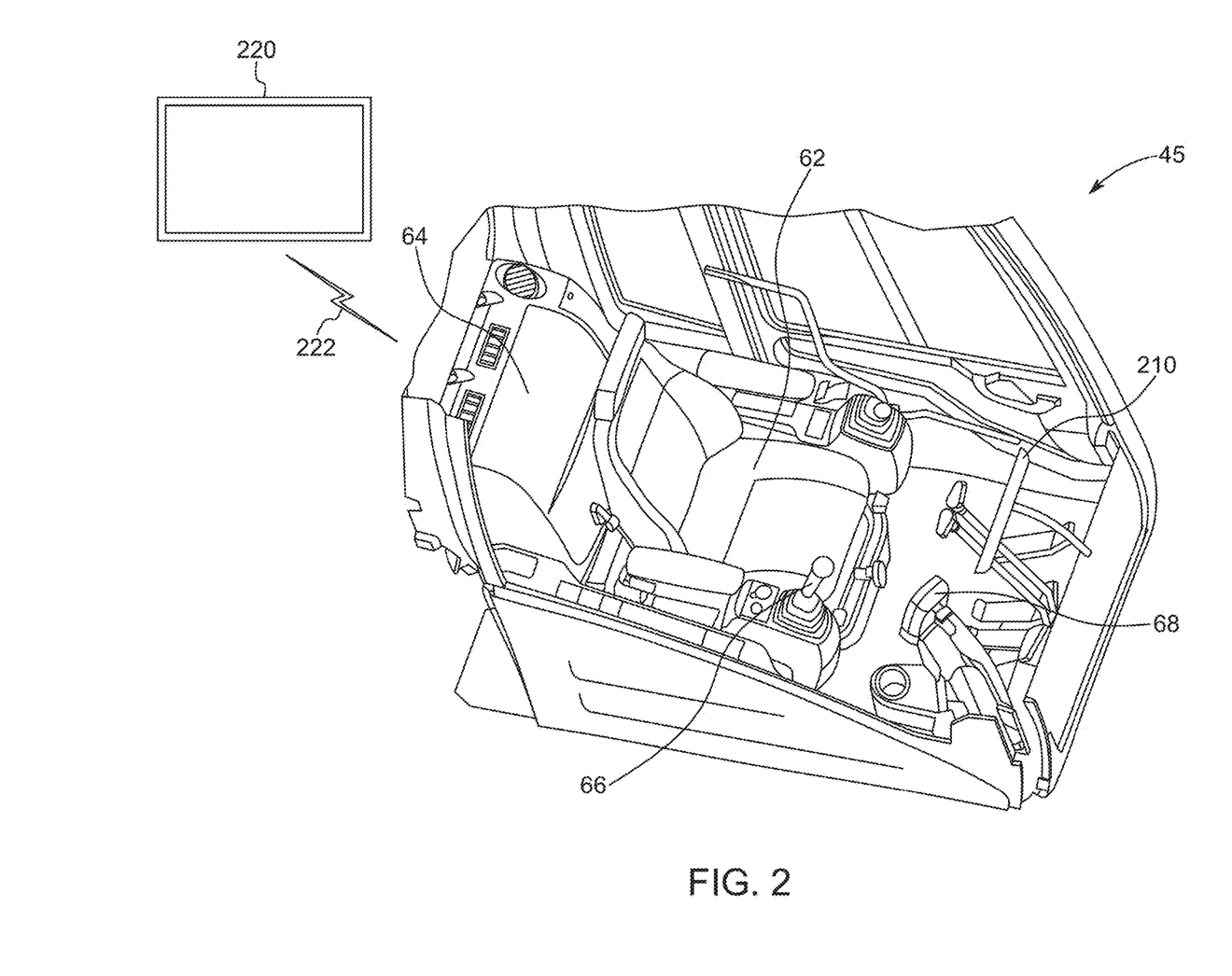
FIG. 2 is an illustration of the interior of an exemplary operator cab by which the present inventive concept can be embodied.

FIG. 2 is an illustration of the interior of an exemplary operator cab 45 of work machine 10 by which the present invention can be embodied. Operator cab 45 may include an operator's seat 62 and a complement of operator controls, such as operator lever 66, by which operator commands may be issued. Computer resources, relays, cables, etc., that are responsive to the operator commands may located in a machine cabinet 64. Operator cab 45 may also include a small cab monitor 68 that may be constructed or otherwise configured to display system information as well as composite image data discussed below. Various embodiments of the present invention may also include a large cab monitor 210 that may be situated forward of the operator and in operator FOV 42, whereas small cab monitor 68 may be situated outside of operator FOV 42, e.g., lower and off to the side as illustrated. Large cab monitor 210 may have a wider aspect ratio than that of small cab monitor 68 and may thus provide a broader and more detailed view of the area being worked. In some embodiments, the monitor may be remote from work machine 10, as representatively illustrated at remote monitor 220, and receives video data over a communications link 222. Communications link 222 may also carry remote control information by which a remote operator can operate work machine 10.

Figure 3:
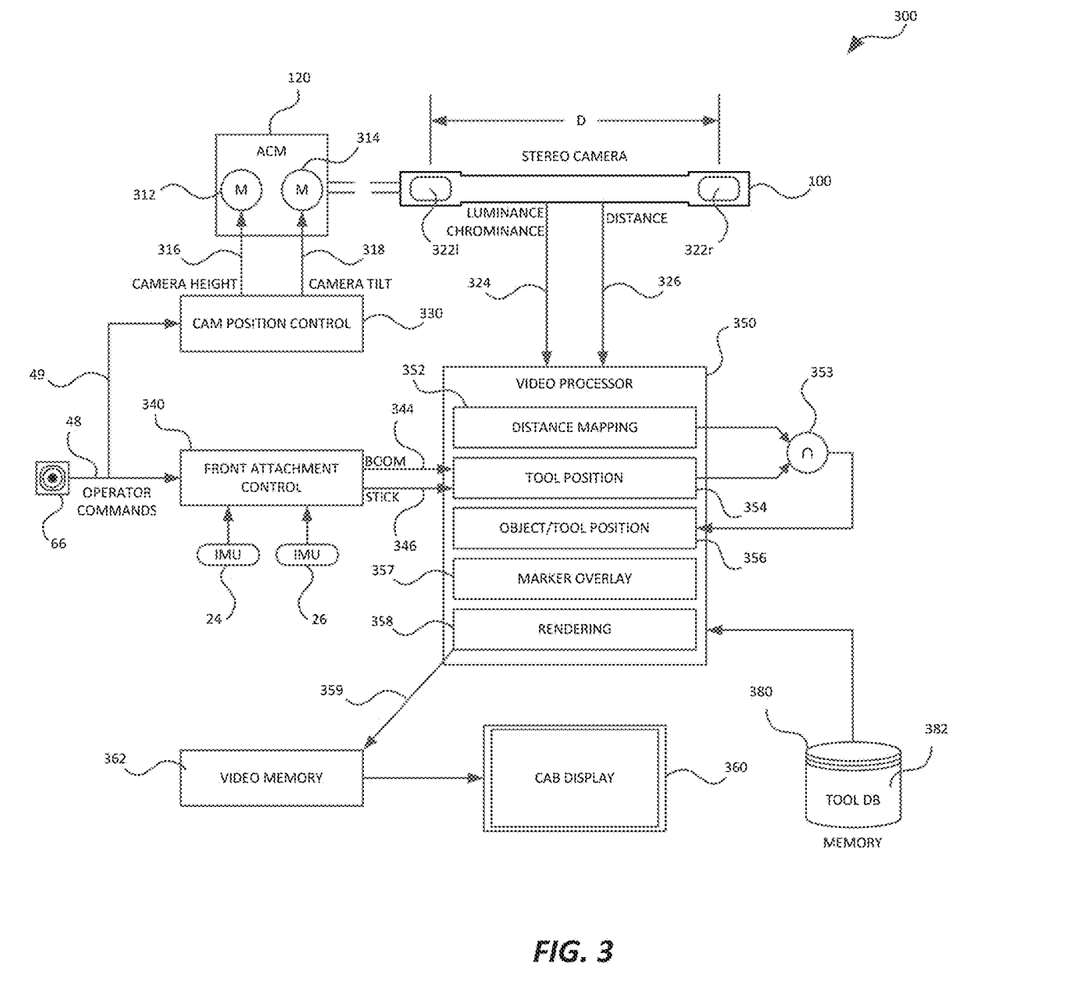
FIG. 3 is a schematic block diagram of an exemplary object visualization system by which the present inventive concept can be embodied.

FIG. 3 is a schematic block diagram of an exemplary object visualization system 300 by which the present inventive concept can be embodied. In the example illustrated, stereo camera 100 is constructed or otherwise configured to generate video data, e.g., through luminance/chrominance data 324, as well as distance data 326 indicative of visual depths (distances) along the camera LOS 140 to respective objects within the camera FOV $\psi$ at distance resolution $\Delta$. It is to be understood that while these data are illustrated in the figure as being provided directly from a module or unified optical/data processing system, depth or distance using stereoscopic range-finding techniques data is calculable from Euclidian first principles alone knowing the optical inter-axis distance D between left and right optical apertures 322*l* and 322*r* of stereo camera 100 and need not be computed within the same housing as the stereo camera optics. In the illustrated example, distance data may be derived from interframe disparities between image capturing sensor arrays (not illustrated) that are behind respective monoculars (not illustrated) of stereo camera 100 whose respective left and right optical apertures 322*l* and 322*r* are a distance D apart. It is to be assumed that distance data 326 include computer-readable data that associates distance computed from, for example, the interframe disparities discussed above, with objects captured in luminance/chrominance data 324. In certain embodiments, distance data 326 and luminance/chrominance data 324 may be output products of a system that combines parallel monocular optical systems, digital stereo vision hardware and optionally software, image processing hardware and optionally software, and output and optionally input circuitry on a single chassis and/or within a single housing. Some commercially available stereo cameras that produce those output products may be used in some embodiments. Implementation details as to the production of distance data, e.g., distance data 326, and related video data, i.e., luminance/chrominance data 324, are not essential to the practice of the present invention—modern and/or conventional techniques may be used—and are thus omitted for brevity.

Taking a broad view, object visualization system 300 may be considered as comprising operator controls, representatively illustrated at operator lever 66, controller circuitry, representatively illustrated at camera position controller 330 and front attachment controller 340, a video data processor, representatively illustrated at video processing circuitry 350 and video memory 362, and a display, such as cab display 360. From the same broad view, as the operator performs tasks, the controller circuitry, in addition to providing control signals that operate the physical machinery, may provide machine sensor data from which a tool position can be estimated. Concurrently with collecting the machine sensor data, both video data and distance data generated at the stereo camera may be collected as well and both datasets may be provided to the video data processor. There, the distance data are analyzed in view of the estimated tool position, objects at the estimated tool position, as established from the distance data, are highlighted or otherwise indicated to, overlaid on the video data and displayed on the display. Embodiments of the present invention may perform such video processing on video and distance data generated from an elevated viewpoint for clearly indicating objects in the work area.

Exemplary work machine 10 may be operated through operator controls of varying type and function, all of which can be implemented using conventional techniques and are represented in FIG. 3 by operator lever 66. These controls may produce command signals or, equivalently, messages, representatively illustrated at operator commands 47, that compel some activity, such as moving the working arm 20 or operating work tool grappler thumb 34. Among those operator controls may be that which, when activated, generates a deploy camera command 49. The present invention is not specific to a particular control by which deploy camera command 49 is generated; in one embodiment, the deploy camera command 49 is generated in response to turning on large cab monitor 210. Once generated, deploy camera command 49 may be provided to a camera position controller 330 that may be constructed or otherwise configured to energize ACM extension actuator motor 312 of ACM extension actuator 107 by providing a camera extension signal 316 and ACM camera tilt actuator motor 314 of ACM camera tilt actuator 124 by providing a camera tilt signal 318. Camera extension signal 316 may be activated to raise stereo camera 100 to ACM elevation H and camera tilt signal 318 may be activated to point stereo camera 100 at target through camera tilt angle Q.

Among operator commands 48 may be those provided to front attachment controller 340 that operate working arm 20. Front attachment controller 340 may be provided feedback as to the configuration in which working arm 20 is found during operation thereof via sensors, such as boom IMU 24 and stick IMU 26. The commanded work arm configuration, which establishes the spatial position of work tool 30, may be reflected in boom position signal 344 and stick position signal 346, which may be provided to video processor circuitry 350.

Prior to performing a construction task, a work tool appropriate to that task may be attached to working arm 20, such as work tool 30. Object visualization system 300 may include a tool database 382 stored in memory circuitry 380 that retains dimensions and other information regarding the selected work tool, which information may be retrieved by the system and utilized to estimate the location of the target position, e.g., distal end 35 of work tool 30.

As the construction task proceeds, dual processes, among others, operate simultaneously: the spatial position of work tool 30 is continually updated as is luminance/chrominance data 324 and distance data 326. This information may be conveyed to video processor circuitry 350 at which a continually updated display image may be generated in which objects in the work area are prominently indicated to.

Distance data 326 may be provided to distance mapping processing component 352 at which a distance map may be generated. Such a distance map may be a computer-readable association of visual object information and distance information indicative of the distance to that visual object. Meanwhile, boom position signal 344 and stick position signal 346 may be provided to a tool position processing component 354 by which the spatial location of work tool 30 is computed. Object/tool position processing component 356 may compute the logical intersection, representatively illustrated at intersection operator 353, of the tool position computed by tool position processing component 354 and object positions computed by distance mapping processing component 352. The intersection operation may produce a dataset comprising object information regarding an object at the work tool position, which may be provided to marker overlay processing component 357. Thereat, a video overlay may be generated or rendered via rendering component 358 that prominently indicates what objects may exist in the work area. Generated video overlay data may be combined with luminance/chrominance data 324 and rendered into video memory 362 as composite image data 359, e.g., video overlaid with surroundings awareness indicators. The composite image data may be ultimately displayed on cab display 360.

Figure 4:
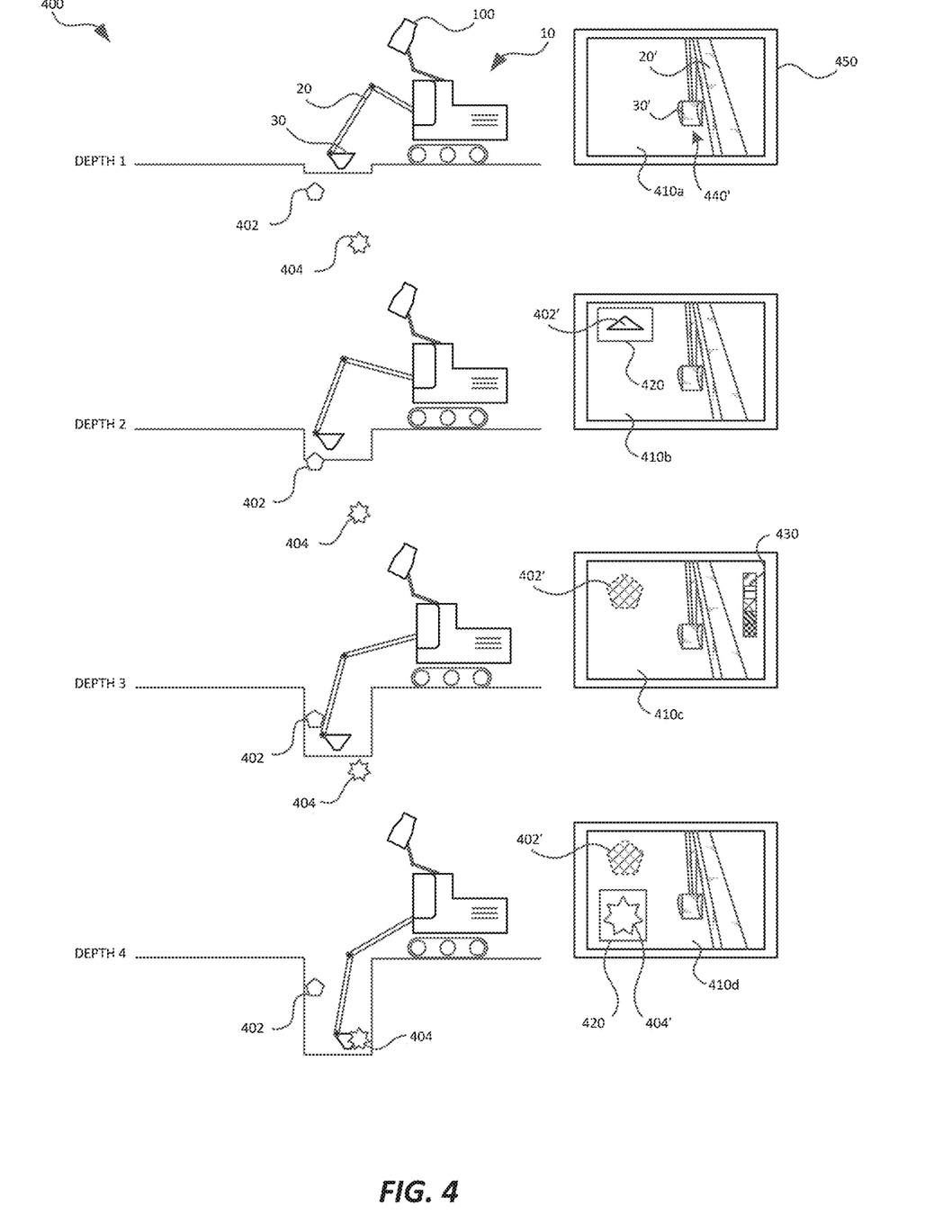
FIG. 4 is an illustration of an exemplary excavation process using an embodiment of the present inventive concept.

FIG. 4 is an illustration of an exemplary excavation process 400 using an embodiment of the present invention. The figure is divided into panels, each depicting deeper excavation into the ground, e.g., depths 1-4. Each panel also includes an exemplary composite image, e.g., respective composite images 410a-410d, displayed on a monitor 450.

Embodiments of the present invention may employ what is referred to herein as a "focus scheme" through which objects are displayed at various levels of prominence depending on where work tool 30 is positioned. As one example, a focus scheme may be established that may surround an image of an object when work tool 30 is within a set distance from the object. The focus scheme may further grey-out or otherwise deemphasize the image of the object when the object is within camera FOV v but not within the aforementioned set distance from the object. In some embodiments, edge detection may be employed and edges of objects may be highlighted.

At depth 1, work machine 10 may have attached a work tool 30, deployed stereo camera 100 and begun digging. Composite image 410a on monitor 450 may include a working arm image 20', a work tool image 30' and a work area image 440'. At depth 2, work machine 10 may encounter an upper object 402, which remains partially buried. Composite image 410b may include an upper object image 402' within an object indicator 420. In this example composite image 410b, object indicator 420 may be a frame generated by, for example, marker overlay processing component 357 that surrounds upper object image 402'. A wide array of other object indicators may be used in conjunction with embodiments of the present invention to indicate objects in a work area without departing from the spirit and intended scope thereof.

At depth 3, excavation may have proceeded beyond the depth of upper object 402 and, subject to the applied focus scheme, upper object image 402' may be deemphasized. However, certain embodiments may implement a focus scheme in which upper object image 402' is indicated to, such as by surrounding upper object image 402' with the frame, as work tool 30 passes upper object 402 on its way toward lower object 404, and then deemphasized as shown in composite image 410c when work tool 30 has passed upper object 402. As illustrated in the panel marked depth 4, a composite image, e.g., composite image 410d, may include images of more than one object, each at varying levels of emphasis according to the focus scheme, for instance, the upper object image 402' deemphasized and a lower object image 404' corresponding to the lower object 404 having an object indicator 420 therearound. In some embodiments, the varying levels of emphasis correspond to the object's depth, which may be identified or estimated through, for example, a depth legend 430.

Figure 5:
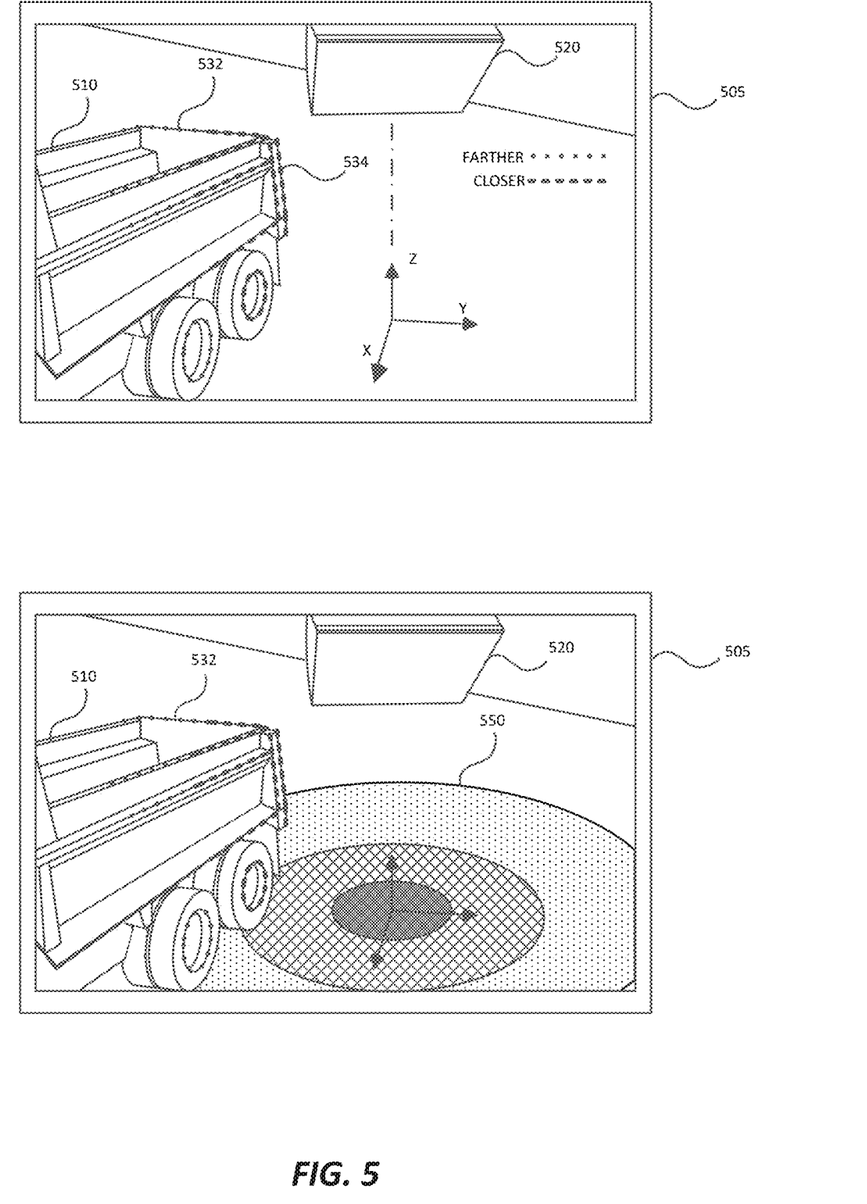
FIG. 5 is an illustration of an exemplary loading operation using an embodiment of the present inventive concept.

FIG. 5 is an illustration of an exemplary loading operation using an embodiment of the present inventive concept. Using similar or analogous techniques of those described above with reference to FIG. 4, which discusses object visualization during excavation along the Z-axis, embodiments of the present invention may highlight objects as work is performed in the X-Y plane as well. FIG. 5 depicts a view on monitor 505 of a hauling machine 510 that is constructed or otherwise configured to haul material over a ground surface. Material may be loaded onto hauling machine 510 by a work machine bucket 520, which may be mechanically coupled to a work machine equipped with a stereo camera as described above. The view presented on monitor 505 may be a composite image generated by the stereo camera and processes described herein.

For purposes of description, a projection of the position of work machine bucket 520 on the ground surface, i.e., the X-Y plane, is illustrated and may move in the X-Y plane in concert with the movement of work machine bucket 520. The position of work machine bucket 520 relative to that of hauling machine 510 may establish the manner in which objects are highlighted. As illustrated in FIG. 5, edges of hauling machine 510 may be detected by suitable edge detection techniques and highlighted or otherwise indicated to according to an enforced focus scheme. For example, edges 534 that are closer to work machine bucket 520 are marked in a different manner, e.g., different colors, shadings, fills, etc., than those edges 532 farther from work machine bucket 520. Edges outside a specified distance from work machine bucket 540 may remain unmarked. As work machine bucket 520 is swung about, markings in the composite image displayed on monitor 505 may change according to the enforced focus scheme to indicate proximity to work machine bucket 520.

As depicted in the lower panel of FIG. 5, the focus scheme may include a ground indicator 550 comprising a set of coaxial fields centered on work machine bucket 520. Each field of the set of coaxial fields may be of a distinct shade, color, fill, etc., in a way by which the work machine operator can assess relative distances to different objects. Additionally, edges on vertically-oriented objects, such as those on hauling machine 510, may be indicated to or highlighted in accordance with the field in which that edge resides.

Figure 6:
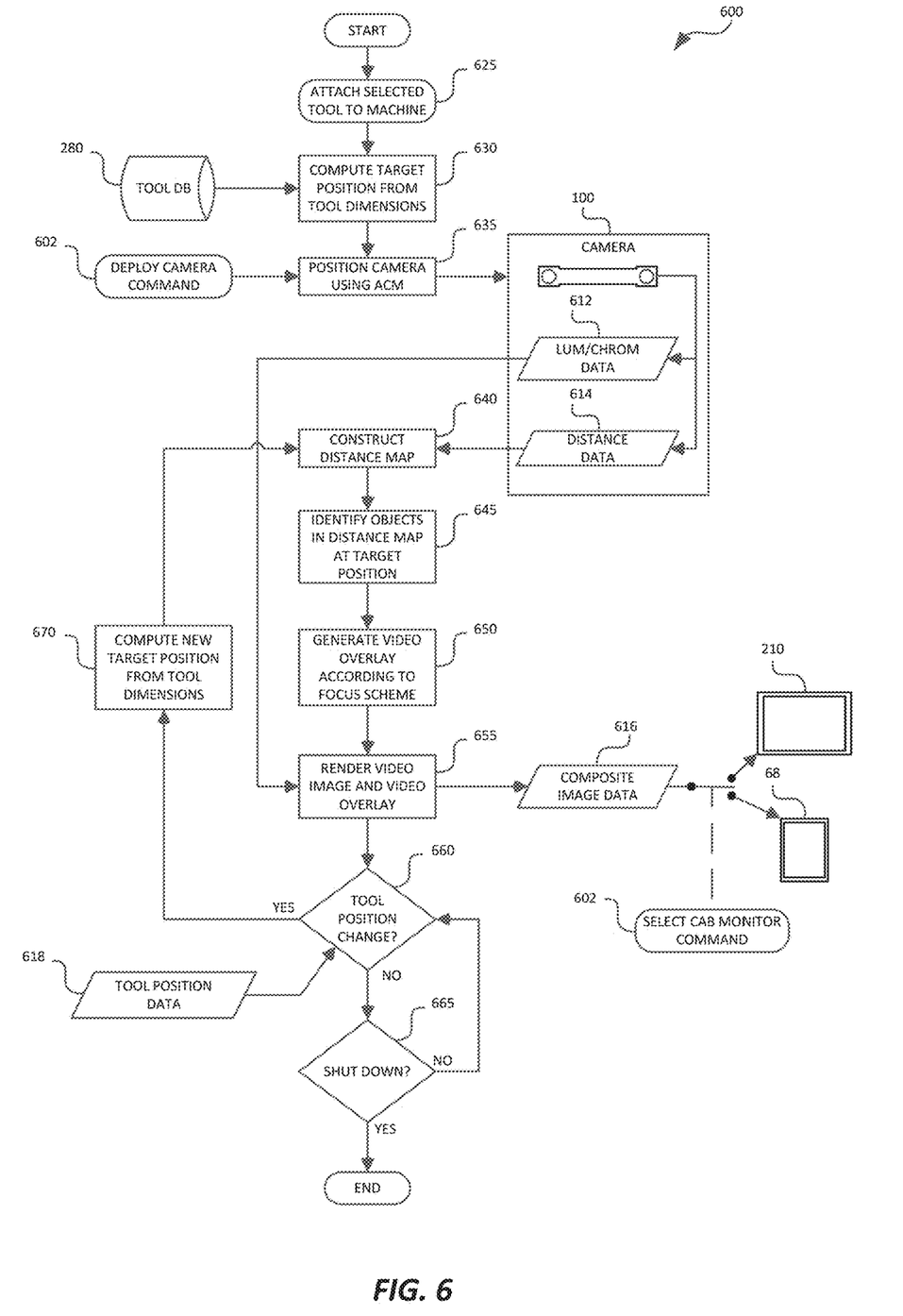
FIG. 6 is a flow diagram of an exemplary object visualization process by which the present inventive concept can be embodied.

FIG. 6 is a flow diagram of an exemplary object visualization process 600 by which the present inventive concept can be embodied. At operation 625, an operator may attach a work tool to the work machine. In operation 630, a target position may be computed inclusive of dimensions of the attached work tool retrieved from tool database 280. The operator may also issue a select cab monitor command 604 that determines which of large cab monitor 210 or small cab monitor 68 is used to display composite image data 616. Additionally, the operator may issue a deploy camera command 602 in response to which operation 635 may position the camera via the ACM, such as to an ACM height H and a camera tilt angle (2, and camera 100 may continually generate luminance/chrominance data 612 and distance data 614. In operation 640, a distance map may be constructed from distance data 614 and, in operation 645, objects in the distance map that are at the work tool position may be identified. Object visualization process 600 may transition to operation 650, whereby a video overlay may be generated according to a focus scheme. In operation 655, a video image produced from luminance/chrominance data 612 may be overlaid with the video overlay to form composite image data 616 that may be displayed on the selected monitor. Operation 660 may be executed to determine from tool position data 618 whether the work tool position has changed and, if so, process 600 may transition to operation 670, whereby a new target position may be computed from the tool dimensions and an updated distance map may be constructed in operation 640. In operation 665, it may be determined whether object visualization process 600 is to be shut down, and remains at operation 665 until either a positive indication for shutting down or until the work tool changes position.

Certain embodiments of the present general inventive concept provide for the functional components to manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices. Examples of non-transitory computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present general inventive concept as exemplified by the embodiments described above.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents. As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware.

Use of the terms "data," "content," "information" and similar terms may be used interchangeably, according to some example embodiments of the present disclosure, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Aspects of the present disclosure have been described above with reference to flowchart illustrations and/or block diagrams of methods, apparatus (systems) and computer program products according to embodiments of the present disclosure. In this regard, the flowchart and block diagrams in the Figures illustrate the architecture, functionality, and operation of possible implementations of systems, methods and computer program products according to various embodiments of the present disclosure. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

INDUSTRIAL APPLICABILITY

It is essential that an operator of heavy construction equipment have a clear view of where a work tool is located as well as of any objects that may be in the work area. This is not only a matter of personnel safety but is also key to the level of quality at which the construction task is completed. The operator view suffers limitations when the position of the work tool is removed a substantial distance from the operator cab, a situation that is increasingly common with the size and overall capabilities of modern construction heavy equipment.

The inventive concept of this disclosure mitigates poor operator viewing via an elevated camera and video processing that produces an overhead view of the work area and indicators that emphasize objects that are in the work area. These and other features described herein improve personnel safety.

The invention claimed is:

1. An excavator having a working arm at a distal end of which a work tool is attached, the excavator comprising:
   a stereo camera constructed to generate video data and distance data;
   an operator cab constructed on a chassis and having an interior and an exterior;
   a monitor in the interior of the operator cab and constructed to display visual data from the stereo camera based on the generated video data;
   a camera mount mechanically coupled to the excavator and interposed between the exterior of the operator cab and the stereo camera, the camera mount constructed to extend to position the stereo camera at a camera position at a height above and spaced from the operator cab such that the stereo camera faces toward the work tool to capture images in a field of view of the stereo camera that includes a portion of the working arm including the work tool; and
   processing circuitry constructed to:
      compute a spatial location of the work tool based on collected machine sensor data from one or more sensors on the working arm;
      determine a range to target from the stereo camera to a predetermined target position of the work tool based on said camera position of the stereo camera and based on the spatial location of the work tool;
      analyze the distance data from the stereo camera and the determined range to target corresponding to the computed spatial location of the work tool to render a video overlay including;
         an object indicator that visually emphasizes a first object image of a first physical object of a plurality of physical objects in the field of view of the stereo camera and external to the excavator at the spatial location of the work tool, and
         deemphasis of a second object image of a second physical object of the plurality of physical objects in the field of view of the stereo camera and external to the excavator a set distance away from the spatial location of the work tool; and display on the monitor a composite image comprised of:
imagery corresponding to the video data associated with the field of view of the stereo camera including the portion of the working arm including the work tool, the object image of the first physical object, and the second physical object, and
the rendered video overlay over the first object image of the first physical object and the second object image of the second physical object.

2. The excavator of claim 1, wherein the predetermined target position of the work tool is either a location of a connecting pin connecting the work tool to the distal end of the working arm or a distal end of the work tool opposite the location of the connecting pin.

3. The excavator of claim 1, wherein the deemphasis of the second object image of the second physical object grays-out the second object image.

4. The excavator of claim 1, further comprising a second monitor, different from the monitor to display the composite image, in the interior of the operator cab,
wherein the monitor to display the composite image has a display area greater than a second display area of the second monitor, and
wherein the monitor to display the composite image is aligned with the working arm and the second monitor is offset relative to the working arm.

5. The excavator of claim 1, wherein the processing circuitry is further constructed to:
render the video overlay to include a distance legend indicating distances represented in the composite video image.

6. The excavator of claim 1, further comprising:
a control in the interior of the operator cab and constructed to operate the working arm,
wherein the processing circuitry is further constructed to:
recompute the spatial location of the work tool responsive to operation of the working arm as indicated by a position signal corresponding to the operation of the working arm.

7. The excavator of claim 1, wherein the video overlay is rendered according to a focus scheme implemented by the processing circuitry through which corresponding ones of the object images, including the first object image and the second object image, are displayed on the display at various levels of prominence depending upon positioning of the work tool.

8. An object visualization process in a construction work machine operating in a work area, the construction work machine comprising an operator cab from which an operator performs construction tasks in the work area by controlling a work tool removably coupled to a working arm of the construction work machine, and a traveling body by which the construction work machine moves along a ground surface, the process comprising:
computing a spatial location of the work tool based on machine sensor data from one or more sensors on the working arm of the construction work machine;
capturing at a same time, using a camera operatively and movably coupled to the work machine, line-of-sight video data of the work tool at the computed spatial location and of a plurality of physical objects external to the construction work machine in the work area;
analyzing distance data based on the line-of-site video data from the camera for each of the plurality of physical objects relative to a determined distance from the camera to a target position of the work tool corresponding to the computed spatial location of the work tool to identify a first physical object of the plurality of physical objects that is within a set distance away from the work tool and to identify a second physical object of the plurality of physical objects that is not within the set distance away from the work tool;
rendering a video overlay including:
an object indicator that visually emphasizes a first object image of the first physical object that is within the set distance away from the work tool, and
a deemphasis of a second object image of the second physical object that is not within the set distance away from the work tool; and
displaying, on a monitor inside the operator cab, a composite image corresponding to the line-of-sight video data with the work tool and the first and second object images respectively corresponding to the first and second physical objects, and the rendered video overlay.

9. The object visualization process of claim 8, further comprising: determining using the camera, the distance from the camera to the target position of the work tool.

10. The object visualization process of claim 8, wherein said rendering the video overlay is part of a focus scheme through which corresponding ones of the object images, including the first object image and the second object image, are displayed on the display at various levels of prominence depending upon positioning of the work tool.

11. The object visualization process of claim 8, wherein said rendering the video overlay includes a visual frame surrounding the first object image of the first physical object.

12. The object visualization process of claim 8, further comprising:
rendering the video overlay to include a distance legend indicating distances represented in the composite image.

13. The object visualization process of claim 8, further comprising:
elevating the camera relative to the operator cab to align a line-of-sight thereof with the spatial location of the work tool.

14. An object visualization system on a construction work machine having an operator cab from which a working arm is operated to perform construction tasks and from which a traveling body is operated to transport the construction work machine across a ground surface, the object visualization system comprising:
a monitor installed in an interior of the operator cab and constructed to display visual data at least corresponding to video data from a camera positioned at a height above the operator cab; and
circuitry configured to:
determine a range to target from the camera to a determined target position on a work tool attached to the working arm according to positioning of the working arm such that the work tool is in a field of view of the camera;
analyze the distance data from the camera and the determined range to target from the camera to the determined target position to render a video overlay; and
display on the monitor a composite image of the video data from the camera and the rendered video overlay, wherein the rendered video overlay implements a focus scheme that includes:
  a first visual emphasis for a first physical object in the field of view of the camera at a position of the work tool,
  a second visual emphasis, different from the first visual emphasis, for a second physical object in the field of view of the camera but not at the position of the work tool, and
  the first visual emphasis visually indicates greater emphasis than the second visual emphasis.

15. The object visualization system of claim 14, further comprising:
  the camera, the camera being configured to determine the target position on the work tool.

16. The object visualization system of claim 14, wherein the circuitry is further configured to:
  render the video overlay to include edge indicators on edges of an object image corresponding to the first visual emphasis for the first physical object.

17. The object visualization system of claim 14, wherein the circuitry is further configured to:
  render the video overlay to include a distance legend indicating distances represented in the composite image.

18. The object visualization system of claim 14, wherein the field of view of the camera includes a portion of the working arm, the work tool, the first physical object, and the second physical object.

19. The object visualization system of claim 14, wherein the circuitry is configured to determine the target position on the work tool.

20. The object visualization system of claim 14,
  wherein the first visual emphasis includes an object indicator around a first object image on the display corresponding to the first physical object, and
  wherein the second visual emphasis grays-out on the display a second object image corresponding to the second physical object.

* * * * *